(12) United States Patent
Lee et al.

(10) Patent No.: US 8,873,206 B2
(45) Date of Patent: Oct. 28, 2014

(54) SWITCH CONTROL CIRCUIT, SWITCH CONTROLLING METHOD, AND POWER SUPPLY DEVICE USING THE SWITCH CONTROL CIRCUIT

(75) Inventors: Young-Je Lee, Bucheon (KR); Gye-Hyun Cho, Incheon (KR); Seung-Woo Hong, Seoul (KR); Jae-yong Lee, Seongnam (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 500 days.

(21) Appl. No.: 13/342,404

(22) Filed: Jan. 3, 2012

(65) Prior Publication Data
US 2012/0188670 A1    Jul. 26, 2012

(30) Foreign Application Priority Data
Jan. 26, 2011    (KR) .................. 10-2011-0007982

(51) Int. Cl.
*H02H 7/00* (2006.01)
*H05B 33/08* (2006.01)
*H02H 3/24* (2006.01)

(52) U.S. Cl.
CPC ............. *H02H 3/24* (2013.01); *H05B 33/0815* (2013.01); *H05B 33/089* (2013.01)
USPC ............................................ 361/18

(58) Field of Classification Search
USPC ............................................ 361/18
See application file for complete search history.

(56) References Cited

U.S. PATENT DOCUMENTS

| | | | |
|---|---|---|---|
| 6,411,065 B1 * | 6/2002 | Underwood et al. | 322/20 |
| 7,382,595 B2 * | 6/2008 | Thurk et al. | 361/93.1 |
| 7,542,257 B2 * | 6/2009 | McCormick et al. | 361/91.1 |
| 7,852,017 B1 * | 12/2010 | Melanson | 315/291 |
| 2008/0224636 A1 * | 9/2008 | Melanson | 315/307 |
| 2008/0278092 A1 * | 11/2008 | Lys et al. | 315/247 |
| 2010/0039836 A1 * | 2/2010 | Gong et al. | 363/21.13 |
| 2010/0308742 A1 * | 12/2010 | Melanson | 315/224 |
| 2012/0188670 A1 * | 7/2012 | Lee et al. | 361/56 |
| 2012/0218670 A1 * | 8/2012 | Han | 361/18 |
| 2012/0229046 A1 * | 9/2012 | Melanson | 315/247 |
| 2013/0234532 A1 * | 9/2013 | Fells et al. | 307/104 |
| 2014/0042926 A1 * | 2/2014 | Melanson | 315/247 |

* cited by examiner

*Primary Examiner* — Ronald W Leja
(74) *Attorney, Agent, or Firm* — Okamoto & Benedicto LLP

(57) ABSTRACT

Embodiments of the present invention relate to a switch control circuit, a switch control method, and a power supply device using the same.

Embodiments generate a reference signal according to a full-wave rectification voltage and control a switching operation of a power switch according to a comparing result of a sense voltage corresponding to a current flowing to the power switch and the reference voltage. Embodiments determine whether a line is opened between a first output terminal and a second output terminal of the power supply device using the sense voltage. When the line is opened, Embodiments turn off the protection switch.

20 Claims, 5 Drawing Sheets

SWITCH CONTROL CIRCUIT, SWITCH CONTROLLING METHOD, AND POWER SUPPLY DEVICE USING THE SWITCH CONTROL CIRCUIT

CROSS-REFERENCE TO RELATED APPLICATION

This application claims priority to and the benefit of Korean Patent Application No. 10-2011-0007982 filed in the Korean Intellectual Property Office on Jan. 26, 2011, the entire contents of which are incorporated herein by reference.

BACKGROUND (a) Field

Embodiments of the present invention relate to a switch control circuit, a switch control method, and a converter using the same. In further detail, Embodiments of the present invention relate to a non-insulating power supply device, a switch control circuit used in the non-insulating power supply device, and a switch control method.

(b) Description of the Related Art

Compared to an insulating power supply device, a non-insulating power supply device is simple in design and has inexpensive production cost. However, the non-insulating power supply device has a safety problem compared to the insulating power supply. In further detail, a user may be exposed to electric impact due to an AC input supplied to the non-insulating power supply device.

For example, an insulating power supply device is applied to an LED device supplied with AC input. In this case, the AC input and an output terminal connected with an LED lamp are insulated so that a user is not exposed to electric impact due to the AC input when the user exchanges the LED lamp.

On the contrary, when a non-insulating power supply device is applied to an LED device, an AC input and an output terminal connected to an LED lamp are electrically connected. In this case, a user may be exposed to the electric impact due to the AC input when the user exchanges the LED lamp.

As described, the non-insulating power supply device has a problem in safety with respect to electric impact even though it has merits in design and production cost.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention have been made in an effort to provide a switch control circuit that can improve safety of a non-insulating power supply from electric shock, and a switch control method.

An exemplary embodiment of the present invention provides a power supply device having advantages of the non-insulating power supply device, that is, a simple structure and inexpensive production cost and assuring stability compared to an insulating power supply device.

A power supply device according to an exemplary embodiment of the present invention includes: a DC-link wire connected between a full-wave rectification voltage and a first output terminal and having a protection switch formed therein; an inductor charging power using the full-wave rectification voltage and supplying the power to a load connected between the first output terminal and a second output terminal; a power switch connected to the inductor and controlling power supplied to the load; and a switch control circuit generating a reference signal according to the full-wave rectification signal, controlling a switching operation of the power switch according to a result of comparison between a sense voltage corresponding to a current flowing to the power switch and the reference voltage, determining whether an open line between the first output terminal and the second output terminal using the sense voltage, and turning off the protection switch when the line open is generated.

The switch control circuit determines whether a line is opened according to the result of the comparison between a sense voltage at a turn-off time point of the power switch and a predetermined open reference voltage.

The switch control circuit determines that the line is opened when a period during which the sense voltage is lower than the open reference voltage is maintained longer than a predetermined open determination period.

The switch control circuit turns off the protection switch for a predetermined open protection period after the open determination period, and starts the next open protection period when the sense voltage is lower than the open reference voltage during the next open determination period after expiration of the open protection period.

The switch control circuit terminates the open line protection operation when the AC input to the power supply device is blocked due to a plug-out after the open determination period.

The switch control circuit includes an open protection operator that determines whether a line is opened using the sense voltage for every switching cycle of the power switch and turns off the protection switch when the line-open is determined.

The open protection operation includes: a comparator generating an open comparison signal according to a comparison result between the sense voltage and a predetermined open reference voltage; a D-flipflop synchronized by an inverse gate control signal that is an inverse signal of a gate control signal controlling the switching operation of the power switch to generate a comparison output voltage according to the open comparison signal; a first login gate generating a counter reset signal by performing a logic operation on a under-voltage lockout signal that is generated when the comparison output voltage, the protection expiring signal, and the power voltage are lower than a predetermined normal level; a second logic gate generating a protection reset signal by performing a logic operation on the protection expiring signal and the under-voltage lockout signal to control termination of the open line protection operation; an SR latch generating an open protection signal controlling the start of the open ling protection operation by being synchronized by the protection start signal and controlling termination of the open line protection operation by being synchronized by the protection reset signal; and a high voltage device controller controlling the switching operation of the protection switch according to the open protection signal.

The open protection operator includes: a comparator generating an open comparison signal according to a comparison result between the sense voltage and a predetermined open reference voltage; a D-flipflop synchronized by an inverse gate control signal that is an inverse signal of the gate control signal that controls the switching operation of the power switch to generate a comparison output voltage according to the open comparison signal; a counter counting a clock signal that determines a switching frequency of the power switch to generate a protection start signal when the open determination period is passed; a first logic gate generating the counter reset signal by performing a logic operation on a under-voltage lockout signal that is generated when the comparison output voltage and the power voltage are lower than a predetermined normal level; a first logic gate generating the counter reset signal by performing a logic operation on a under-voltage lockout signal that is generated when the comparison output voltage and the power voltage are lower than a predetermined normal level; a high voltage device controller controlling the switching operation of the protection switch according to the open protection signal.

A switch control circuit according to another exemplary embodiment of the present invention controls an operation of a protection switch connected between a full-wave rectification voltage rectified from an AC input and a first output terminal and controlling a switching operation of a power switch that controls power supplied to a load connected between the first output terminal and a second output terminal through an inductor charged with power by the full-wave rectification voltage.

The switch control circuit includes: a reference signal generator generating a reference signal according to the full-wave rectification voltage; a PWM controller controlling the switching operation of the power switch according to a comparison result between a sense voltage corresponding to a current flowing to the power switch with the reference signal; and an open protection operator determining whether a line between the first output terminal and the second output terminal is opened using the sense voltage and turning off the protection switch when the line open occurs.

The open protection operator compares a sense voltage of the turn-off time of the power switch with a predetermined open reference voltage, and determines the line is opened when a period during which the sense voltage is lower than open reference voltage is maintained longer than a predetermined open determination period.

The open protection operator turns off the protection switch during a predetermined open protection period after the open determination period, and starts the next open protection period when the sense voltage is lower than the open reference voltage during the next open determination period after the open protection period is terminated.

The open protection operator terminates the open line protection operation when the AC input to a power supply device including the switch control circuit is blocked due to a plug-out after then open determination period.

The open protection operator includes: a comparator generating an open comparison signal according to a comparison result between the sense voltage and a predetermined open reference voltage; a D-flipflop synchronized by an inverse gate control signal that is an inverse signal of a gate control signal that controls the switching operation of the power switch to generate a comparison output voltage according to the open comparison signal; a counter counting a clock signal that determines a switching frequency of the power switch to generate a protection start signal when the open determination period is passed and generating a protection expiring signal when the open protection period is passed; a first logic gate performing a logic operation on a under-voltage lockout signal that is generated when the comparison output voltage, the protection expiring signal, and a power voltage for operation of the switch control circuit are lower than a predetermined normal level to generate the counter reset signal; a second logic gate performing a logic operation on the protection expiring signal and the under-voltage lockout signal to generate a protection reset signal for control of termination of the open line protection operation; an SR latch generating an open protection signal controlling the start of the open line protection operation by being synchronized by the protection start signal and controlling termination of the open line protection operation by being synchronized by the protection reset signal; and a high voltage device controller controlling the switching operation of the protection switch according to the open protection signal.

The open protection operator includes: a comparator generating an open comparison signal according to a comparison result between the sense voltage and a predetermined open reference voltage; a D-flipflop synchronized by an inverse gate control signal that is an inverse signal of the gate control signal that controls the switching operation of the power switch to generate a comparison output voltage according to the open comparison signal; a counter counting a clock signal that determines a switching frequency of the power switch to generate a protection start signal when the open determination period is passed; a third logic gate performing a logic operation on a under-voltage lockout signal that is generated when the comparison output voltage and a power voltage for operation of the switch control circuit are lower than a predetermined normal level to generate the counter reset signal; an SR latch generating an open protection signal controlling the start of the open ling protection operation by being synchronized by the protection start signal an controlling termination of the open ling protection operation by being synchronized by the low-voltage blocking signal; and a high voltage device controller controlling the switching operation of the protection switch according to the open protection signal.

A switch control method according to another exemplary embodiment of the present invention controls a switching operation of a power switch that controls an operation of a protection switch connected between a full-wave rectification voltage rectified from an AC input and a first output terminal and controls a switching operation of a power switch that controls power supplied to a load connected between the first output terminal and a second output terminal through an inductor charged with power by the full-wave rectification voltage.

The switch control method includes: generating a reference signal according to the full-wave rectification voltage; controlling the switching operation of the power switch according to the comparison result between a sense voltage corresponding to a current flowing to the power switch with the reference signal; and determining whether a line between the first output terminal and the second output terminal is opened using the sense voltage, and turning off the protection switch controlling the open protection operation when the line open occurs.

The controlling of the open protection operation includes comparing a sense voltage at a turn-off time of the power switch and a predetermined open reference voltage and determining the line is opened when a period during which the sense voltage is lower than the open reference voltage is maintained longer than a predetermined open determination period.

The controlling of the open protection operation further includes turning off the protection switch during a predetermined open protection period after the open determination period and starting the next open protection period when the sense voltage is lower than the open reference voltage during the next open determination period after the open protection period.

The controlling of the open protection operation further includes: counting a clock signal that determines a switching frequency of the power switch to generate a protection start signal when the open determination period is passed and generating a protection expiring signal when the open protection period is passed; resetting the counting result of the clock signal according to a logic operation result of a under-voltage lockout signal that is generated when the protection expiring signal and a power voltage for switching control operation of the power switch are lower than a predetermined normal level as a result of the comparison between the sense voltage and the open reference voltage; and controlling termination of the open line protection operation by performing a logic operation on the protection expiring signal and the low-voltage blocking signal.

The controlling of the open protection operation further includes terminating the open line protection operation when a plug-out occurs and thus the AC input to a power supply device including the switch control circuit is blocked after then open determination period The controlling of the open protection operation further includes: generating a protection start signal when an open determination period is passed by counting a clock signal that determines the switching frequency of the power switch; resetting the counting result of the clock signal according to the comparison result between the sense voltage and the open reference voltage and the result of the logic operation performed on a under-voltage lockout signal that is generated when the protection expiring signal and a power voltage for switching control operation of the power switch are lower than a predetermined normal level; and controlling the start of the open ling protection operation by being synchronized by the protection start signal and controlling termination of the open line protection operation by being synchronized by the low-voltage blocking signal.

The present invention provides a switch control circuit and a switch control method that can improve stability of a non-insulating power supply device.

Accordingly, a power supply device having advantages of the non-insulating power supply device, that is, a simple structure and inexpensive production cost and assuring stability compared to an insulating power supply device can be provided.

DETAILED DESCRIPTION OF THE EMBODIMENTS

Figure 1:
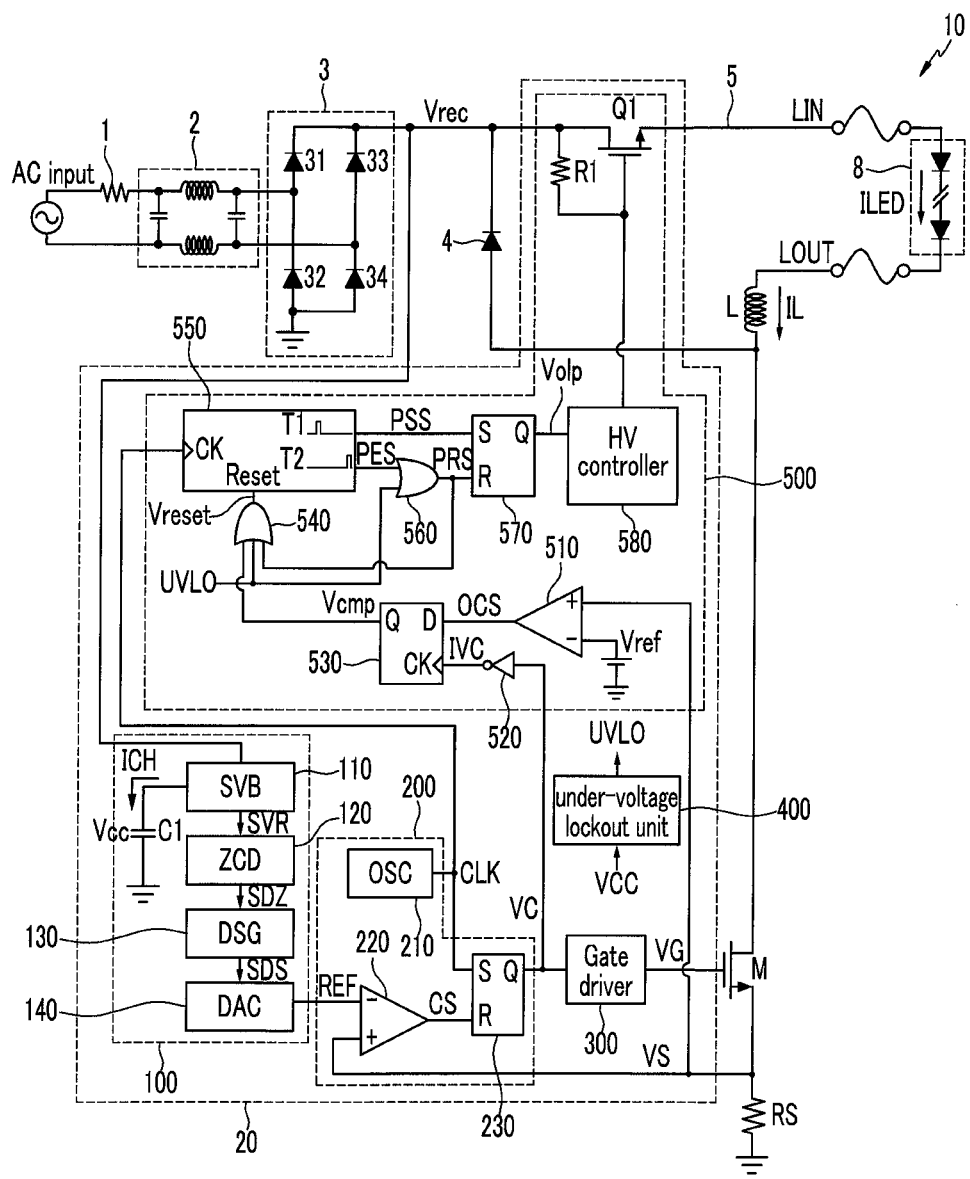
FIG. 1 shows a power supply device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Further, in the specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

The present invention will be described more fully hereinafter with reference to the accompanying drawings, in which exemplary embodiments of the invention are shown.

FIG. 1 shows a power supply device according to an exemplary embodiment of the present invention. In the exemplary embodiment of the present invention, the power supply device is realized as a buck converter. However, the present invention is not limited thereto, and the present invention may be applied to any type of topology converter that can be designed as a non-insulating supply device.

As shown in FIG. 1, a power supply device 10 includes a power switch M, a switch control circuit 8 for controlling switching operation of the power switch M, a fuse 1, an electromagnetic interference (EMI) filter 2, a bridge diode 3, a diode 4, a DC-link wire 5, and an inductor L. The power switch M is realized as an n-channel metal oxide semiconductor filed effect transistor (NMOSFET). The present invention is not limited thereto, and other type of transistor element may be applied as necessary.

The LED string 8 includes a plurality of LED elements coupled in series. The fuse 1 is disconnected when an AC input current is excessively high such that elements of the power supply device 10 can be prevented from being damaged. The EMI filter 2 filters electromagnetic wave interference of the AC input.

The bridge diode 3 is formed of four diodes 31 to 34, and generates a full-wave rectification voltage Vrec by wave-rectifying the AC input. The full-wave rectification voltage Vrec is transmitted to the LED string 8 along the DC-link wire 5.

A protection switch Q1 is formed in the middle of the DC-link wire 5 of the power supply device of the exemplary embodiment of the present invention. When output ends LIN and LOUT of the power supply device 10 are opened, the protection switch Q1 is turned off. Operation of the protection switch Q1 will be described later in further detail.

The full-wave rectification voltage Vrec supplies power voltage for operation of the LED string 8. The inductor L charges power using the full-wave rectification voltage Vrec depending on the switching operation of the power switch M, and supplies the power to the LED string 8. A first end of the inductor L is connected to the LED string 8 and a second end thereof is connected to the power switch M. In further detail, during the turn-on period of the power switch M, a current generated from the full-wave rectification voltage Vrec flows to the inductor L, and during the turn-off period of the power switch M, power charged in the inductor L is supplied to the LED string 8.

The diode 4 is a fast recovery diode, and includes an anode connected to a drain electrode of the power switch M and the second end of the inductor L and a cathode connected to the DC-link wire 5. The diode 4 is connected during the turn-off period of the power switch M and thus transmits an inductor current IL to the LED string 8.

The power switch M controls the inductor current IL to control power supplied to a load disposed between the output end LIN and the output end LOUT. The power switch M includes a drain electrode connected to the second end of the inductor L, a source electrode connected to a first end of a sense resistor RS, and a gate electrode to which a gate signal VG transmitted from the switch control circuit 20 is input. The power switch M is switch by the gate signal VG.

The power switch M is turned on, and the inductor current IL flows through the LED string 8 and the power switch M. A current (hereinafter, referred to as a drain current Ids) flows to the resistor RS such that a sense voltage VS is generated. A current rectified by the bridge diode 3 is supplied to the LED string 8 depending on the switching operation of the power switch M. When the power switch M is turned on, the inductor current IL flows to the inductor L is generated and the LED string 8 emits light according to the inductor current IL. A current flowing to the LED string 8 is referred to as an LED current ILED.

The switch control circuit 20 generates a power voltage VCC using the full-wave rectification voltage Vrec, generates a reference signal REF having a phase that is the same as that of the full-wave rectification voltage Vrec using a zero crossing point of the full-wave rectification voltage Vrec, and controls the switching operation of the power switch M using the reference signal REF and the sense voltage VS. In this case, the switch control circuit 20 senses the sense voltage VS at each switching period to detect whether opening between the output ends LIN and LOUT of the power supply device 10 is occurred. The opening between the output end LIN and the output end LOUT is called a line open.

When the line-open is detected, the switch control circuit 20 opens the DC-link wire 5 to block power supplied to the output ends LIN and LOUT of the power supply device 10. Such a blocking operation is called an open line protection operation.

When detecting termination of the line-open, the switch control circuit 20 supplies power to the load. After the line-open is terminated, the switch control circuit 20 can supply the power to the load by re-connecting the DC-link wire 5. Alternatively, the switch control circuit 20 may connect the DC-link wire 5 again to supply power to the load after supplying of AC input to the power supply device 10 is blocked and then the AC input is supplied again.

In the exemplary embodiment of the present invention, the former is referred to as an auto restart type and the latter is referred to as an under-voltage lock-out latch type. FIG. 1 illustrates the switch control circuit 20 as an auto restart type switch control circuit.

The switch control circuit 20 includes a reference signal generator 100, a PWM controller 200, a gate driver 300, an under-voltage lockout unit 400, and an open protection operator 500.

The reference signal generator 100 receives the full-wave rectification voltage Vrec, detects a zero crossing point of the full-wave rectification voltage Vrec, and generates a reference signal synchronized with the full-wave rectification voltage Vrec. The reference signal REF is transmitted to the PWM controller 200.

The reference signal generator 100 includes a self VCC biasing circuit (SVB) 110, a zero crossing detection (ZCD) 120, a digital sine wave generator (DSG) 130, and a digital-analog converter (DAC) 140.

The SVB 110 generates a charging current ICH for charging a capacitor C1 using the full-wave rectification voltage Vrec. A voltage charged in the capacitor C1 is the power voltage VCC. The power voltage VCC supplies a voltage for operation of the switch control circuit 20.

The ZCD 120 receives a signal SVR corresponding to the full-wave rectification voltage Vrec to detect a time point that the full-wave rectification voltage Vrec becomes zero voltage. A charging current ICH for charging the capacitor C1 is low near the zero crossing point where the full-wave rectification voltage Vrec becomes zero. Further, the power voltage VCC may be decreased due to the decrease of the charging current ICH near the zero crossing point. Thus, the ZCD 120 can predict the zero crossing point of the full-wave rectification voltage Vrec by sensing the charging current ICH or the power voltage VCC.

In further detail, the charging current ICH is decreased and then increased according to the full-wave rectification voltage Vrec during a period that the charging current ICH is decreased when is close to zero voltage and then increased. In this case, the power voltage VCC is also decreased and then increased according to the full-wave rectification voltage Vrec. The ZCD 120 may sense a time point that the decreasing charging current ICH or the decreasing power voltage VCC starts to increase as the zero voltage crossing point. The ZCD 120 generates a detection signal SDZ generated by being synchronized at the zero voltage crossing point.

As one example, the ZCD 120 may determine a middle point of a time point that the charging current ICH is decreased to be lower than a predetermined level and a time point that the charging current ICH is increased over the predetermined level as the zero voltage crossing point. The signal SVR is a signal corresponding to the charging current ICH. The ZCD 120 may use the power voltage VCC instead of the charging current ICH. In this case, the signal SVR is a signal corresponding to the power voltage VCC.

The DSG 130 determines one cycle of the full-wave rectification voltage Vrec using the zero voltage crossing point determined by the ZCD 120, and generates a digital signal that is increased or decreased according to increase or decrease of the full-wave rectification voltage Vrec during one cycle. In further detail, the DSG 130 determines an interval of the zero voltage crossing points according to the continuously generated detection signal SDZ, and sets the interval of the zero voltage crossing points as one cycle of the full-wave rectification voltage Vrec. In addition, the DSG 130 generates a digital signal SDS that is decreased after being increased during one cycle of the full-wave rectification voltage Vrec. The increase amount of decrease amount of the digital signal SDS may be set to be a digital value appropriate for realization of a sign wave.

The DAC 140 converts the digital signal SDS into an analog voltage signal in real time and outputs the analog voltage signal. Then, a reference signal REF increased or decreased by being synchronized with the full-wave rectification voltage Vrec is generated.

The PWM controller 200 includes an oscillator 210, a PWM comparator 220, and an SR latch 230.

The oscillator 210 generates a clock signal CLK that determines a switching frequency of the power switch M. The clock signal CLK determines the switching frequency of the power switch M.

The PWM comparator 220 includes a non-inversion terminal (+) to which the sense voltage VS is input and an inversion terminal (−) to which the reference signal REF is input. The PWM comparator 28 outputs a high-level comparison signal CS when a signal input to the non-inversion terminal (+) is higher than a signal input to the inversion terminal (−). Otherwise, the PWM comparator 28 outputs a low-level comparison signal CS.

The SR latch 230 generates a gate control signal VC according to the clock signal CLK. The SR latch 230 includes a set terminal S to which the clock signal CLK is input and a reset terminal R and an output terminal Q where the comparison signal CS is input. The SR latch 230 outputs a high-level signal by being synchronized with a rising edge of the signal input to the set terminal S, and outputs a low-level signal by being synchronized with a rising edge of the signal input to the reset terminal R. Thus, the SR latch 230 is synchronized with the rising edge of the clock signal CLK and thus generates a high-level gate control signal VC, and synchronized with the rising edge of the comparison signal CS and thus generates a low-level gate control signal VC.

When the gate control signal VC becomes high level upon synchronization with the rising edge of the clock signal CLK, the power switch M is turned on by the gate signal VG. The sense voltage CS is increased during the turn-on period of the power switch M, and the PWM comparator 220 outputs a high-level comparison signal CS when the increasing sense voltage CS reaches the reference signal REF. Then, the SR latch 230 generates a low-level gate control signal VC. The power switch M is turned off by the low-level gate signal VG.

The gate driver 300 generates the gate signal VG that controls the switching operation of the power switch according to the gate control signal VC. When the gate signal VG is high level, the power switch M is turned on, and when the gate signal VG is low level, the power switch M is turned off. The gate driver 300 generates a high-level gate signal VG according to the high-level gate control signal VC, and generates a low-level gate signal VG according to the low-level gate control signal VC.

The under-voltage lockout unit 400 receives the power voltage VCC, and determines whether the power voltage VCC is in the normal state, that is, higher that a predetermined threshold voltage for operation of the switch control circuit 20. The under-voltage lockout unit 400 generates a under-voltage lockout signal UVLO when the power voltage VCC is lower than the threshold voltage.

In further detail, when the power voltage VCC is maintained higher than the threshold voltage and then decreased lower than the threshold voltage, the under-voltage lockout unit 400 generates a under-voltage lockout signal UVLO. When the power voltage VCC starts to increase, the under-voltage lockout unit 400 generates the under-voltage lockout signal UVLO during a period that the power voltage VCC is lower than the threshold voltage. Since the under-voltage lockout unit 400 generates the under-voltage lockout signal UVLO using the power voltage VCC, the under-voltage lockout signal UVLO generated when the power voltage VCC is lower than the threshold voltage may have a waveform decreasing equal to the power voltage VCC.

The open protection operator 500 determines whether a line is opened using the sense voltage VS at each switching cycle of the power switch M. In further detail, the open protection operator 500 compares the sense voltage VS and an open reference voltage Vref at the turn-off time of the power switch M and determines whether line-open between the output ends LIN and LOUT is occurred according to the comparison result. When a period that the sense voltage VS is lower than the open reference voltage Vref is maintained longer than an open determination period T1 according to the comparison result, the open protection operator 500 determines that the line-open is occurred. Once the line-open is determined to be occurred, the open protection operator 500 turns off the protection switch Q1.

The open protection operator 500 includes a comparator 510, an inverter 520, a D-flipflop 530, a first logic gate 540, a counter 550, a second logic gate 560, an SR latch 570, a high voltage device controller (hereinafter, referred to as an HV controller) 580, a protection switch Q1, and a resistor R1.

The comparator 510 includes an inversion terminal (−) to which the open reference voltage Vref is input and a non-inversion terminal (+) to which the sense voltage VS is input. The comparator 510 outputs a high-level open comparison signal OCS when the sense voltage VS is higher than the open reference voltage Vref. Otherwise, the comparator 510 outputs a low-level open comparison signal OCS.

The inverter 520 receives the gate control signal VC, and generates an inverse gate control signal IVC by inverting the gate control signal VC.

The D-flipflop 530 generates a comparison output voltage Vcmp according to the open comparison signal OCS input to an input terminal D thereof by being synchronized with the inverse gate control signal IVC input to a clock terminal CK thereof. The D-flipflop 530 according to the exemplary embodiment of the present invention is synchronized with a rising edge of the inverse gate control signal. IVC and thus generates the comparison output voltage Vcmp according to the open comparison signal OCS at the rising edge point. That is, when the open comparison signal OCS is high level at the rising edge point of the inverse gate control signal IVC, the D-flipflop 530 generates a high-level comparison output voltage Vcmp, and when the open comparison signal OCS is low level at the rising edge point of the inverse gate control signal IVC, the D-flipflop 530 generates a low-level comparison output signal Vcmp.

The counter 550 determines elapse of the open determination period T1 and an open protection period T2 by counting the clock signal CLK. The counter 550 counts the cycle of the clock signal CLK input to the clock terminal CK from a time point that a reset signal Vreset reaches a level that operates the counter 550, and generates a protection start signal PSS to instructs open protection operation when the counting result corresponds to the open determination period T1. The counter 550 counts the cycle of the clock signal CLK from the termination point of the open determination period T1, and generates a protection expiring signal PES that terminates the open protection operation when the counting result corresponds to the open protection period T2.

The counter 550 according to the exemplary embodiment of the present invention is reset at a rising edge of the reset signal Vreset, does not perform any operation during a period that the reset signal Vreset is high level, and operates during a period that the reset signal Vreset is low level. Being reset of the counter 550 implies that the counting result of the counter 550 is initialized. Although it is described that the counter 550 determines whether the open protection period T2 is passed by counting the clock signal after termination of the open determination period T1, but the present invention is not limited thereto.

When the counter 550 counts the clock signal and the counting result reaches a value corresponding to the open determination period T1, the protection start signal PSS may be generated, and when the counting result reaches a value corresponding to the open protection period T2, the protection expiring signal PES may be generated.

The first logic gate 540 generates the reset signal Vreset according to the comparison output signal Vcmp, the under-voltage lockout signal UVLO, and an output signal of the second logic gate 560. The first logic gate 540 resets the counter 550 when the sense voltage VS is higher than the open reference voltage Vref, when the under-voltage lockout signal UVLO is generated, or when the open protection period P2 is expired.

When the power voltage VCC maintains a normal level so that the under-voltage lockout signal is not generated and the output ends LIN and LOUT are not opened (i.e., in the normal state), a level of the reset signal Vreset is determined according to a level of the low-level comparison output signal Vcmp. That is, the counter 550 starts operation when the sense voltage VS is lower than the open reference voltage Vref. For this, the first logic gate 540 is realized as an OR gate performing OR operation.

The second logic gate 560 generates an output signal according to the protection expiring signal PES and the under-voltage lockout signal UVLO. The second logic gate 560 resets the open protection signal VoIp to terminate the open protection operation when the under-voltage lockout signal UVLO is generated or when the protection expiring signal PES is generated. For this, the second logic gate 560 is realized as an OR gate performing OR operation. The output signal of the second logic gate 560 is referred to as a protection reset signal PRS.

In the exemplary embodiment of the present invention, the first logic gate 540 and the second logic gate 560 are realized as OR gates, but they may be changed according to level design of the output signal depending on each input signal. However, the present invention is not limited thereto.

The SR latch 570 includes a set terminal S to which the protection start signal PSS is input, a reset terminal R to which the protection reset signal Vreset is input, and an output terminal Q through which an open protection signal VoIp generated according to the protection start signal PSS and the protection reset signal Vreset is output. The SR latch 570 according to the exemplary embodiment of the present invention performs the same operation as of the SR latch 230.

Thus, when the protection start signal PSS is generated, the SR latch 570 generates a high-level open protection signal VoIp, and when the protection reset signal Vreset is generated, the SR latch 570 generates a low-level open protection signal.

The HV controller 580 controls the opened line protection operation by controlling the switching operation of the protection switch Q1. In further detail, when the high-level open protection signal VoIp is input, the HV controller 580 turns off the protection switch Q1, and when the low-level open protection signal VoIp is input, the HV controller 580 turns on the protection switch Q1.

The resistor R1 is connected between a drain electrode and a gate electrode of the protection switch Q1. The resistor R1 is provided to turn on the protection switch Q1 for a period during which the HV controller 580 is not operated by the low-level open protection signal VoIp not in the open line state but in the normal state.

When a current flows through the resistor R1, a capacitor (not shown) between the gate electrode and the source electrode of the protection switch Q1 is charged. Then, the protection switch Q1 is turned on in the normal state.

When the line is opened and thus the state is changed to an abnormal state, the HV controller 580 performs operation by the high-level open protection signal VoIp. In this case, the HV controller 580 sinks the current flowing through the resistor R1 and charges charged in the capacitor between the gate-source electrodes of the protection switch Q1 to thereby turn off the protection switch Q1.

Hereinafter, open line protection operation according to the present exemplary embodiment of the present invention will be described with reference to FIG. 2A, FIG. 2B, and FIG. 3.

Figure 2A:
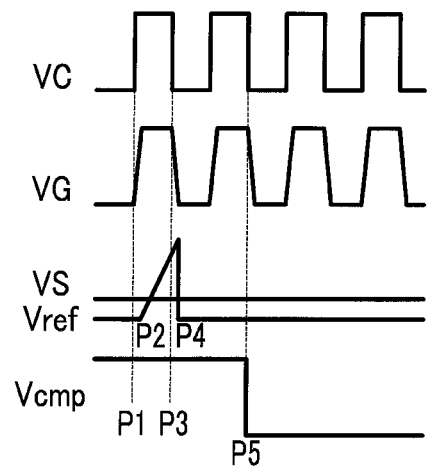
FIG. 2A shows a gate control signal, a gate signal, a sense voltage, and a comparison output signal when a normal state is changed to an abnormal state.

FIG. 2A shows a gate control signal, a gate signal, a sense voltage, and a comparison output signal when the open line protection operation is changed to the abnormal state from the normal state. The normal state indicates that the output terminals LIN and LOUT are not opened and the LED string 80 is connected between the output terminal LIN and the output terminal LOUT. The abnormal state indicates that line-open so that the output terminals LIN and LOUT are disconnected.

When the gate control signal VC is increased at a time point P1, the gate signal VG is increased at the time point P1. The sense voltage VS is increased for periods P2 to P4 during which the power switch M is turned on by the gate signal VG.

When the gate control signal VC is decreased at a time point P3, the gate signal VG is decreased at the time point P3. At a time P4 that the power switch M is turned off by the gate signal VG, the sense voltage VS is decreased.

When the gate control signal VC is decreased at the time point P3, the inverse gate control signal IVC is increased and a rising edge is input to the clock end CK of the D-flipflop 530. The D-flipflop 530 is synchronized at the rising edge of the time point P3 and thus outputs the open comparison signal OCS input to the input terminal D as a comparison output signal Vcmp.

The time point P3 is prior to a time point P4 at which the power switch M is turned off, and the sense voltage Vs is higher than the open reference signal Vref so that the open comparison signal OCS is high level. That is, the comparison output signal synchronized at the time point P3 and generated in the normal state is high level.

When the output terminals LIN and LOUT are changed to the abnormal state from the normal state during a period P4 to P5, the open comparison signal OCS is low level because the sense voltage VS is lower than the open reference voltage Vref at a falling time point P5 of the next gate control signal VC.

Then, the D-flopflop 530 is synchronized at the time point P5 and outputs a low-level open comparison signal OCS as a comparison output signal Vcmp. Accordingly, the comparison output signal Vcmp becomes low level at the time point P5.

Since the power voltage VCC is normal, a low-level voltage blocking signal UVLO is not generated, and the protection reset signal Vreset is not generated because the counter 550 is not operated, and therefore all inputs of the first logic gate 540 become low level at the time point P5. From the time point P5, the counter 550 starts operation and the open determination period T1 is started.

Figure 2B:
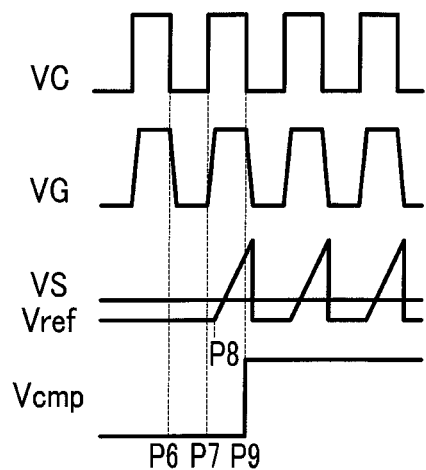
FIG. 2B shows a gate control signal, a gate signal, a sense voltage, and a comparison output signal when the abnormal state is changed to the normal state during an open determination period.

FIG. 2B shows a gate control signal, a gate signal, a sense voltage, and a comparison output signal when the abnormal state is changed to the normal state during the open determination period.

Since the output terminals LIN and LOUT are in the line-open state, that is, in the abnormal state at a time point P6, the sense voltage VS is lower than the open reference voltage Vref and the open comparison signal OCS is low level. Accordingly, the comparison output signal Vcmp is maintained in the low level at the time point P6.

When the abnormal state is changed to the normal state during a period P6 to P7, the power switch M is turned on at a time point P so that the sense voltage VS is increased.

Since the sense voltage VS at the next falling time point P9 of the gate control signal VC is higher than the open reference voltage Vref, the open comparison signal OCS becomes high level. Then, the D-flipflop 530 is synchronized at a rising edge of the inverse gate control signal IVC at the time point P9 and thus a high-level open comparison signal OCS is output as a comparison output signal Vcmp. Accordingly, the comparison output signal Vcmp becomes high level at the time point P9.

The first logic gate 540 generates a high-level reset signal Vreset by the high-level comparison output signal Vcmp. Then, the counter 550 terminates the counting operation.

Hereinafter, the open line protection operation according to the exemplary embodiment of the present invention will be described with reference to FIG. 3.

Figure 3:
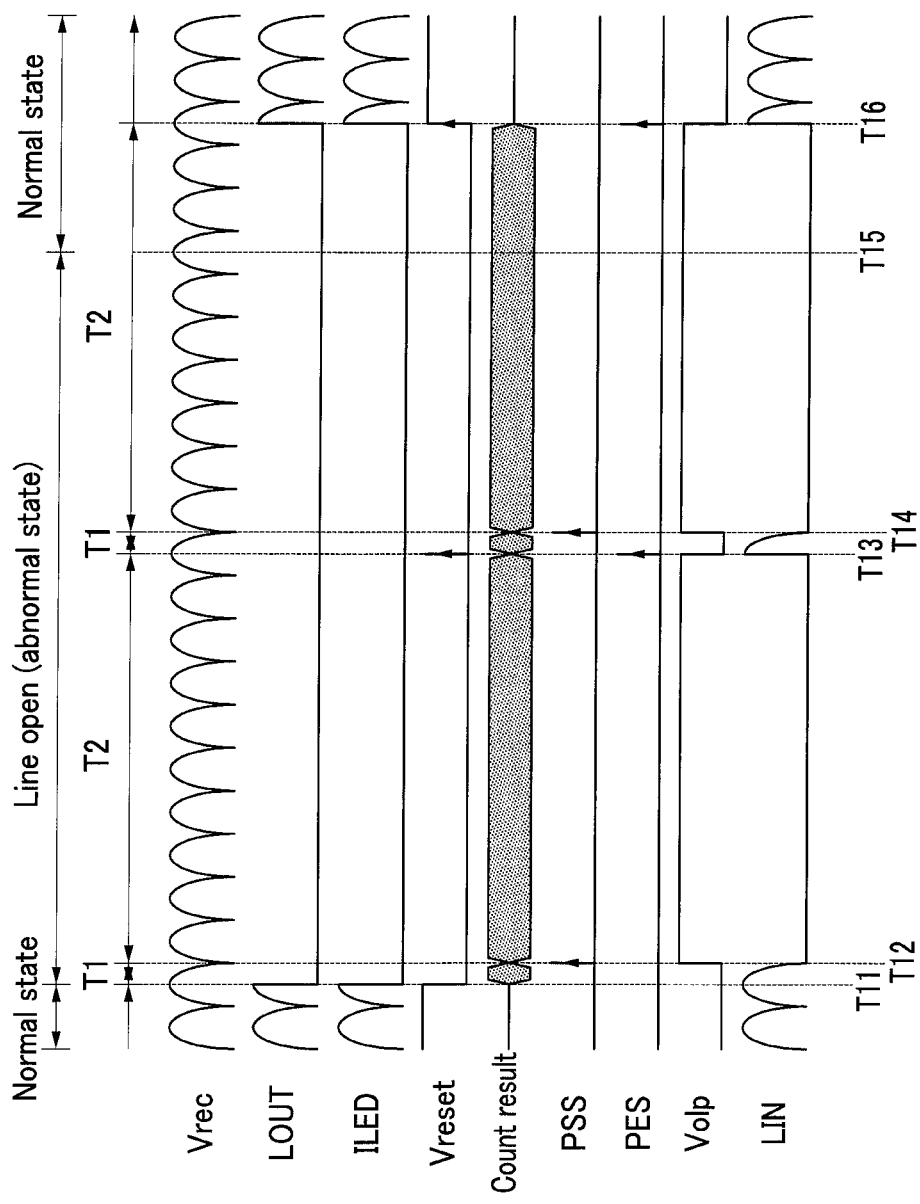
FIG. 3 shows a full-wave rectification voltage, a voltage of an output terminal, an LED current, a reset signal, a counting result, a protection start signal, a protection expiring signal, and an open protection signal according to the exemplary embodiment of the present invention.

FIG. 3 shows a full-wave rectified voltage, an output terminal voltage, a LED current, a reset signal, a counting result, a protection start signal, a protection termination signal, and an open protection signal according to the exemplary embodiment of the present invention. FIG. 3 shows signals according to a case that the normal state is changed to the abnormal state and a case that the abnormal state is changed to the normal state. However, the present invention is not limited to the exemplary embodiment of the present invention.

As shown in FIG. 3, a full-wave rectification voltage Vrec is input to the power supply device 10. At a time point T11, the LED string 8 is separated from the output terminal LIN and the output terminal LOUT and thus the output terminals are opened. That is, the abnormal state starts from the time point T11.

Since a voltage at the output terminal LOUT cannot receive the full-wave rectification voltage Vrec at the time point T11 due to the line-open, the output terminal LOUT has zero voltage. Further, the LED current ILED does not flow due to the line-open.

By being synchronized with a falling time point of a control signal VC generated after a time point T11, the reset signal Vreset becomes low level. The reset signal Vreset becomes low level through the operation described with reference to FIG. 2A.

From a time point T11, the counter 550 counts a clock signal CLK, and the open determination period T1 is started from the time point T11. The count result may be n-bit digital data. FIG. 3 schematically shows the count result.

At a time point T12 that the open determination period T1 is passed, a protection start signal PSS is generated. The protection start signal PSS is illustrated as a short pulse generated at a time point that the open determination period T1 laps. However, the present invention is not limited thereto.

Since the protection switch Q1 is in the turn-on state until the time point T12 that the open line protection operation is started, the output terminal LIN is supplied with the full-wave rectified voltage Vrec until the time point T12. Therefore, the voltage at the output terminal LIN has the same waveform of the full-wave rectified voltage Vrec until the time point T12.

The open protection signal VoIp becomes high level by the protection start signal PSS generated at the time point T12, and the protection switch Q1 is turned off at the time point T12. Then, the full-wave rectified voltage Vrec is not supplied to the output terminal LIN so that the voltage at the output terminal LIN becomes zero voltage.

An open protection period T2 is started from the time point T12. The counter 550 counts the clock signal CLK again at the time T12.

When the open protection period T2 is passed at a time point T13, the counter 550 generates a protection expiring signal PES. The protection expiring signal PES is illustrated as a short pulse generated at a time point that the open protection period T2 laps. However, the present invention is not limited thereto. At a time point T13, the reset signal Vreset is generated as a short pulse according to the protection expiring signal PES, and the open protection signal VoIp becomes low level.

The counter 550 counts the clock signal CLK from the time point T11 that is the count start time, and may generate a protection start signal PSS and a protection expiring signal PES respectively when the counting result reaches values respectively corresponding to the open determination period T1 and the open protection period T2.

The protection switch Q1 is turned on by a low-level open protection signal VoIp, and the counter 550 counts the clock signal CLK from a time point T13 by the reset signal Vreset to determine whether or not the open determination period T1 is passed. Since the protection switch Q1 is turned on from the time point T13, a voltage at the output terminal LIN is generated by the full-wave rectification voltage Vrec.

Since the abnormal state is continued during the period T13 to T14, no sense voltage VS is generated and the comparison output signal Vcmp is maintained with low level so that a rising edge of the reset signal Vreset is not generated.

When the open determination period T1 is passed at the time point T14, the protection start signal PSS is generated again. Then, the open protection signal VoIp becomes high level again such that the protection switch Q1 is turned off. Thus, the voltage of the output terminal LIN becomes zero voltage from the time point T14.

From the time point T14, the counter 550 counts the clock signal CLK to determine whether or not the open protection period T2 is passed. For convenience of description, the abnormal state is terminated and the normal state starts at a time point T15. Even in the normal state, the open protection signal VoIp maintains a high level not until the operation protection period T2 is passed so that the protection switch Q1 maintain the turn-off state.

When the open protection period T2 is passed at a time point T16, the counter 550 generates a protection expiring signal PES. At the time point T16, the reset signal Vreset is increased to a high level according to the protection expiring signal PES, and the reset signal Vreset maintains the high level because a comparison output signal Vcmp generated by being synchronized with a falling edge of the gate control signal VC generated right after the time point T16 is a high level signal. At the time point T16, the open protection signal VoIp is decreased to a low level such that the protection switch Q1 is turned on at the time point T16.

Since the open protection period T2 is terminated at the time point T16, the full-wave rectification voltage Vrec is supplied to the output end LIN from the time point T16, a voltage from the full-wave rectification voltage Vrec is supplied to the output end LOUT, and an LED current ILED also flows.

As described, according to the present exemplary embodiment, the open line protection operation can be automatically started and terminated using the sense voltage with the auto restart type power supply device. Since the protection operation is provided by sensing generation of an open line, electrical shock due to AC input can be prevented even though the power supply device is a non-insulating power supply device.

Hereinafter, a low-voltage blocking latch-type power supply device according to another exemplary embodiment of the present invention will be described with reference to FIG. 4 and FIG. 5.

Like reference numerals designate like elements in the previously described exemplary embodiment and another exemplary embodiment, and only differences between the embodiments are focused on in the following description.

Figure 4:
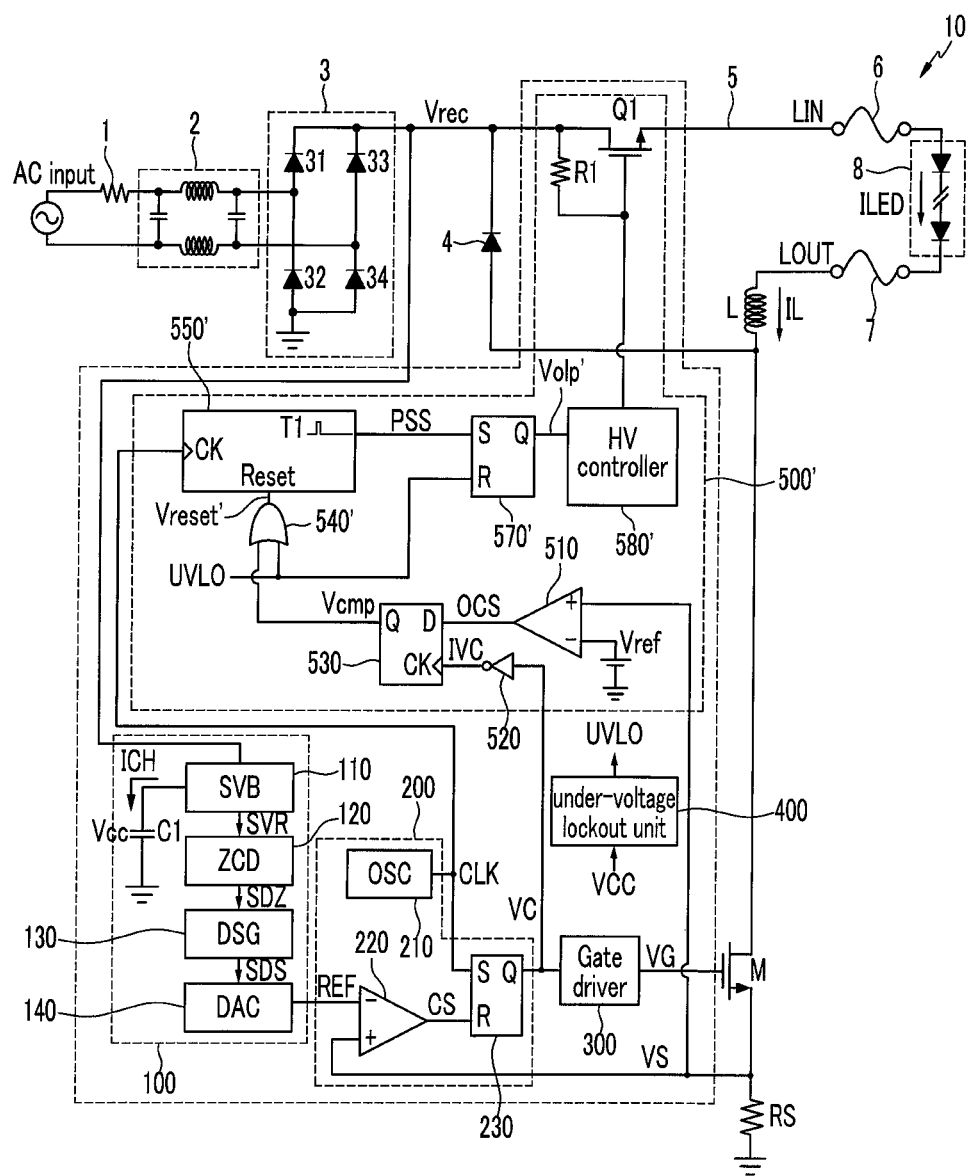
FIG. 4 shows a power supply device according to another exemplary embodiment of the present invention.

FIG. 4 shows a power supply device according to another exemplary embodiment of the present invention.

As shown in FIG. 4, unlike the previous exemplary embodiment, a under-voltage lockout signal UVLO rather the protection reset signal Vreset of the open protection operation 500 resets an SR latch 570' in configuration of an open protection operator 500' according to the present invention.

A comparator 510, an inverter 520, and a D-flipflop 530 of the present exemplary embodiment are the same as those of the previous exemplary embodiment, and therefore the same reference numeral will be designated thereto and descriptions thereof will be omitted.

A counter 550' counts a clock signal CLK to detect whether or not an open determination period T1 is passed. The counter 550' counts a cycle of the clock signal CLK input to a clock terminal CL from a time point that the reset signal Vreset reaches a level for operation of the counter 550', and when the counting result corresponds to the open determination period T1, the counter 550' generates a protection start signal for instructing open protection operation.

The counter 550' according to the present exemplary embodiment is reset at a rising edge of the reset signal Vreset'. The counter 550' does not operate during a period that the reset signal Vreset' is in high level, and operates during a period that the reset signal Vreset' is in low level.

A third logic gate 540' generates a reset signal Vreset' by performing a logical operation on the under-voltage lockout signal UVLO and a comparison output signal Vcmp. The third logic gate 540' resets the counter 550' when the under-voltage lockout signal UVLO is generated or when a sense voltage VS is higher than an open reference voltage Vref.

When the comparison output signal Vcmp becomes low level, the counter 550' is operated by a low-level reset signal Vreset'. When the under-voltage lockout signal UVLO becomes high level, the reset signal Vreset' becomes high level so that operation of the counter 550' is stopped. To generate such a reset signal Vreset', a third logic gate 540' is realized as an OR gate that performs an OR operation. However, the present invention is not limited thereto.

The SR latch 570' includes a set terminal S to which a protection start signal PSS', a reset terminal R to which the under-voltage lockout signal UVLO is input, and an output terminal Q through which an open protection signal VoIp' generated according to the protection start signal PSS' and the under-voltage lockout signal UVLO is output. The SR latch 570' according to the exemplary embodiment of the present invention is the same as the SR latch 230 in operation.

Thus, when the protection start signal PSS' is generated, the SR latch 570' generates a high-level open protection signal VoIp', and when the under-voltage lockout signal UVLO is generated, the SR latch 570' generates a low-level open protection signal VoIp'.

An HV controller 580' controls open line protection operation by controlling switching operation of a protection switch Q1 according to the open protection signal VoIp'. In further detail, when the high-level open protection signal VoIp' is input, the HV controller 580' turns off the protection switch Q1, and when the low-level open protection signal VoIp' is input, the HV controller 580' turns on the protection switch Q1.

As described, the open protection operator 500' according to the other exemplary embodiment terminates the open line protection operation by the under-voltage lockout signal UVLO without having a configuration for counting the open line protection period T2 in the previous exemplary embodiment. The under-voltage lockout signal UVLO is a signal generated for a period during which a power voltage is increased to a normal level in an initial period at which the power supply device starts operation. Thus, the power supply device according to the present exemplary embodiment of the present invention terminates the open line protection operation when the power voltage is lower than a normal level. That is, the open line protection operation is terminated when an AC input is blocked and then the AC input is input again.

In general, since an AC input is input to a power supply device when the power supply device is connected to a plug where AC power reaches, the open line protection operation is terminated only when the power supply device is plugged-in after being plugged-out according to the present exemplary embodiment.

Hereinafter, an open line protection operation according to the other exemplary embodiment of the present invention will be described with reference to FIG. 5.

Figure 5:
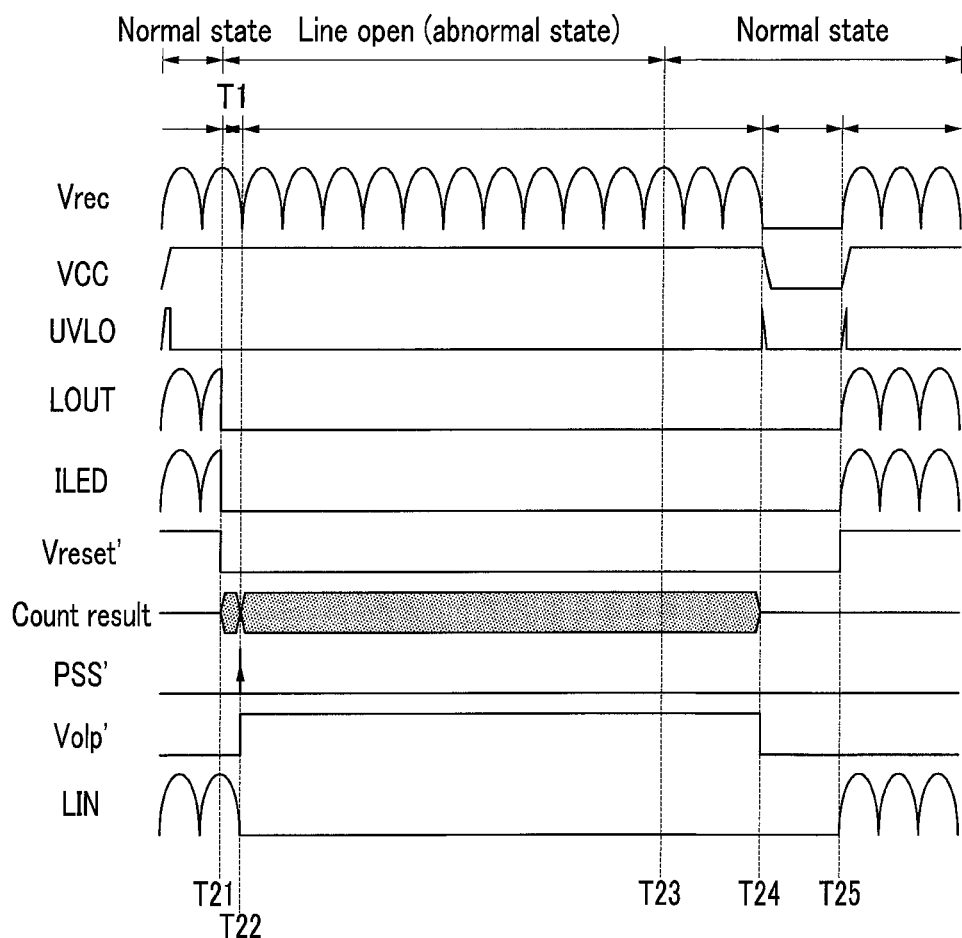
FIG. 5 shows a full-wave rectification voltage, a power voltage, a low-voltage blocking signal, a voltage of an output terminal, an LED current, a reset signal, a counting result, a protection start signal, and an open protection signal according to another exemplary embodiment of the present invention.

FIG. 5 shows a full-wave rectification voltage, a power voltage, a low-voltage blocking signal, a voltage of an output terminal, an LED current, a reset signal, a counting result, a protection start signal, and an open protection signal according to another exemplary embodiment of the present invention. FIG. 5 illustrates signals according to a case that the output terminals LIN and LOUT are changed to the abnormal state from the normal state and to the normal state from the abnormal state. The present exemplary embodiment is provided for description of the present invention, but the present invention is not limited thereto.

As shown in FIG. 5, a full-wave rectification voltage Vrec is input to the power supply device 10'. At a time point T21, an LED string 8 is separated from an input terminal LIN and an output terminal LOUT such that the output terminal is opened. That is, an abnormal state is started from the time point T21.

Since a voltage of the output terminal LOUT cannot be supplied with the full-wave rectification voltage Vrec by line open, the voltage becomes zero voltage. In addition, an LED current ILED does not flow due to the line open.

A reset signal Vreset' is synchronized at a falling time point of a gate control signal VC generated after the time point T21 and thus the reset signal Vreset' becomes a low level signal. Since a sense voltage VS is not sensed by the line open after the time point T21, the comparison output signal Vcmp becomes low level and the reset signal Vreset' becomes high level.

The counter 550' counts a clock signal CLK from the time point T21, an open determination period T1 is started from the time point T21. A count result may be n-bit digital data. At a time point T22 that the open determination period T1 is passed, a protection start signal PSS' is generated. The protection start signal PSS' is illustrated as a short pulse generated at the time that the open determination period T1 is passed. However, the present invention is not limited thereto.

Since the protection switch Q1 is in the turn-on state to the time point T22 at which the open line protection operation is started, the input terminal LIN is supplied with the full-wave rectification voltage Vrec until the time point T22. Thus, the voltage of the output terminal LIN has the same waveform of the full-wave rectification voltage Vrec until the time point T22.

The open protection signal VoIp' becomes high level by the protection start signal PSS' generated at the time point T22, and the protection switch Q1 is turned off at the time point T22. Then, the output terminal LIN cannot be supplied with the full-wave rectification voltage Vrec, and therefore the voltage at the output terminal LIN becomes zero voltage.

In the low-voltage block latch-type power supply device, the open line protection operation is started by the open protection signal VoIp' and maintained until the under-voltage lockout signal UVLO is generated.

At a time point T23, the abnormal state is changed to the normal state. When a plug-out is generated at a time point T24 and thus a power voltage starts to decrease, the under-voltage lockout signal UVLO is generated as a high-level pulse. Although the output terminals are not opened (i.e., normal state) at the time point T23, the open protection signal VoIp' is maintained as the high-level pulse unit being reset by the under-voltage lockout signal UVLO. During a period from T22 to T24, the open line protection operation is maintained and the protection switch Q1 is maintained in the turn-off state.

The count 550' is reset by the high-level reset pulse Vreset' generated at the time point T24. In addition, the under-voltage lockout signal UVLO of the high-level pulse is input to the reset terminal R of the SR latch 570' so that the open protection signal VoIp' is reset to a low-level signal.

When a plug-in is generated at a time point T25 and thus the power voltage starts to increase, a under-voltage lockout signal UVLO of a high-level pulse is generated until the power voltage reaches a normal level. Since the plug-in is generated in the normal state, the sense voltage VS is generated and thus the comparison output signal Vcmp becomes high level, the reset signal Vreset' maintains high level after a time point T25.

As described, in the exemplary embodiment of the present invention according to the low-voltage blocking latch type, the start of the open line protection operation is controlled by the sense voltage and the termination of the open line protection operation is controlled by the low-voltage blocking signal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS power supply device 10, power switch M, switch control circuit 8, fuse 1 EMI filter 2, bridge diode 3, diode 4, 31-34, DC-link wire 5 inductor L, reference signal generator 100, PWM controller 200 gate driver 300, under-voltage lockout unit 400 open protection operator 500, self VCC biasing circuit 110 zero crossing detector 120, digital sine wave generator 130 oscillator 210, digital-to-analog converter 140, PWM comparator 220 SR latch 230, comparator 510, inverter 520, D-flipflop 530 first logic gate 540, 540', counter 550, 550', second logic gate 560 SR latch 570, 570', HV controller 580, 580', protection switch Q1 resistor R1

What is claimed is:

1. A power supply device comprising:
a DC-link wire connected between a full-wave rectification voltage and a first output terminal and having a protection switch formed therein;
an inductor charging power using the full-wave rectification voltage and supplying the power to a load connected between the first output terminal and a second output terminal;
a power switch connected to the inductor and controlling power supplied to the load; and
a switch control circuit generating a reference signal according to the full-wave rectification signal, controlling a switching operation of the power switch according to a result of comparison between a sense voltage corresponding to a current flowing to the power switch and the reference voltage, determining whether an open line between the first output terminal and the second output terminal using the sense voltage, and turning off the protection switch when the line open is generated.

2. The power supply device of claim 1, wherein the switch control circuit determines whether a line is opened according to the result of the comparison between a sense voltage at a turn-off time point of the power switch and a predetermined open reference voltage.

3. The power supply device of claim 2, wherein the switch control circuit determines that the line is opened when a period during which the sense voltage is lower than the open reference voltage is maintained longer than a predetermined open determination period.

4. The power supply device of claim 3, wherein the switch control circuit turns off the protection switch for a predetermined open protection period after the open determination period, and starts the next open protection period when the sense voltage is lower than the open reference voltage during the next open determination period after expiration of the open protection period.

5. The power supply device of claim 3, wherein the switch control circuit terminates the open line protection operation when the AC input to the power supply device is blocked due to a plug-out after the open determination period.

6. The power supply device of claim 1, wherein the switch control circuit comprises an open protection operator that determines whether a line is opened using the sense voltage for every switching cycle of the power switch and turns off the protection switch when the line-open is determined.

7. The power supply device of claim 6, wherein the open protection operator comprises:
a comparator generating an open comparison signal according to a comparison result between the sense voltage and a predetermined open reference voltage;
a D-flipflop synchronized by an inverse gate control signal that is an inverse signal of a gate control signal controlling the switching operation of the power switch to generate a comparison output voltage according to the open comparison signal;
a counter counting a clock signal that determines a switching frequency of the power switch to generate a protection start signal when a open determination period is passed and generating a protection expiring signal when the open protection period is passed;
a first login gate generating a counter reset signal by performing a logic operation on a under-voltage lockout signal that is generated when the comparison output voltage, the protection expiring signal, and the power voltage are lower than a predetermined normal level;
a second logic gate generating a protection reset signal by performing a logic operation on the protection expiring signal and the under-voltage lockout signal to control termination of the open line protection operation;
an SR latch generating an open protection signal controlling the start of the open ling protection operation by being synchronized by the protection start signal and controlling termination of the open line protection operation by being synchronized by the protection reset signal; and
a high voltage device controller controlling the switching operation of the protection switch according to the open protection signal.

8. The power supply device of claim 6, wherein the open protection operator comprises:
a comparator generating an open comparison signal according to a comparison result between the sense voltage and a predetermined open reference voltage;
a D-flipflop synchronized by an inverse gate control signal that is an inverse signal of the gate control signal that controls the switching operation of the power switch to generate a comparison output voltage according to the open comparison signal;
a counter counting a clock signal that determines a switching frequency of the power switch to generate a protection start signal when the open determination period is passed;
a first logic gate generating the counter reset signal by performing a logic operation on a under-voltage lockout signal that is generated when the comparison output voltage and the power voltage are lower than a predetermined normal level;
an SR latch generating an open protection signal controlling the start of the open ling protection operation by being synchronized by the protection start signal an controlling termination of the open ling protection operation by being synchronized by the low-voltage blocking signal; and
a high voltage device controller controlling the switching operation of the protection switch according to the open protection signal.

9. A switch control circuit controlling operation of a protection switch connected between a full-wave rectification voltage rectified from an AC input and a first output terminal and controlling a switching operation of a power switch that controls power supplied to a load connected between the first output terminal and a second output terminal through an inductor charged with power by the full-wave rectification voltage, the switch control circuit comprising:
a reference signal generator generating a reference signal according to the full-wave rectification voltage;
a PWM controller controlling the switching operation of the power switch according to a comparison result between a sense voltage corresponding to a current flowing to the power switch with the reference signal; and
an open protection operator determining whether a line between the first output terminal and the second output terminal is opened using the sense voltage and turning off the protection switch when the line open occurs.

10. The switch control circuit of claim 9, wherein the open protection operator compares a sense voltage of the turn-off time of the power switch with a predetermined open reference voltage, and determines the line is opened when a period during which the sense voltage is lower than open reference voltage is maintained longer than a predetermined open determination period.

11. The switch control circuit of claim 10, wherein the open protection operator turns off the protection switch during a predetermined open protection period after the open determination period, and starts the next open protection period when the sense voltage is lower than the open reference voltage during the next open determination period after the open protection period is terminated.

12. The switch control circuit of claim 11, wherein the open protection operator terminates the open line protection operation when the AC input to a power supply device including the switch control circuit is blocked due to a plug-out after then open determination period.

13. The switch control circuit of claim 10, wherein the open protection operator comprises:

a comparator generating an open comparison signal according to a comparison result between the sense voltage and a predetermined open reference voltage;
a D-flipflop synchronized by an inverse gate control signal that is an inverse signal of a gate control signal that controls the switching operation of the power switch to generate a comparison output voltage according to the open comparison signal;
a counter counting a clock signal that determines a switching frequency of the power switch to generate a protection start signal when the open determination period is passed and generating a protection expiring signal when the open protection period is passed;
a first logic gate performing a logic operation on a under-voltage lockout signal that is generated when the comparison output voltage, the protection expiring signal, and a power voltage for operation of the switch control circuit are lower than a predetermined normal level to generate the counter reset signal;
a second logic gate performing a logic operation on the protection expiring signal and the under-voltage lockout signal to generate a protection reset signal for control of termination of the open line protection operation;
an SR latch generating an open protection signal controlling the start of the open line protection operation by being synchronized by the protection start signal and controlling termination of the open line protection operation by being synchronized by the protection reset signal; and
a high voltage device controller controlling the switching operation of the protection switch according to the open protection signal.

14. The switch control circuit of claim 10, wherein the open protection operator comprises:
a comparator generating an open comparison signal according to a comparison result between the sense voltage and a predetermined open reference voltage;
a D-flipflop synchronized by an inverse gate control signal that is an inverse signal of the gate control signal that controls the switching operation of the power switch to generate a comparison output voltage according to the open comparison signal;
a counter counting a clock signal that determines a switching frequency of the power switch to generate a protection start signal when the open determination period is passed;
a third logic gate performing a logic operation on a under-voltage lockout signal that is generated when the comparison output voltage and a power voltage for operation of the switch control circuit are lower than a predetermined normal level to generate the counter reset signal;
an SR latch generating an open protection signal controlling the start of the open ling protection operation by being synchronized by the protection start signal an controlling termination of the open ling protection operation by being synchronized by the low-voltage blocking signal; and
a high voltage device controller controlling the switching operation of the protection switch according to the open protection signal.

15. A switch control method for controlling a switching operation of a power switch that controls an operation of a protection switch connected between a full-wave rectification voltage rectified from an AC input and a first output terminal and controls a switching operation of a power switch that controls power supplied to a load connected between the first output terminal and a second output terminal through an inductor charged with power by the full-wave rectification voltage, the switch control method comprising:

generating a reference signal according to the full-wave rectification voltage;

controlling the switching operation of the power switch according to the comparison result between a sense voltage corresponding to a current flowing to the power switch with the reference signal; and determining whether a line between the first output terminal and the second output terminal is opened using the sense voltage, and turning off the protection switch controlling the open protection operation when the line open occurs.

16. The switch control method of claim 15, wherein the controlling of the open protection operation comprises:

comparing a sense voltage at a turn-off time of the power switch and a predetermined open reference voltage; and determining the line is opened when a period during which the sense voltage is lower than the open reference voltage is maintained longer than a predetermined open determination period.

17. The switch control method of claim 16, wherein the controlling of the open protection operation further comprises:

turning off the protection switch during a predetermined open protection period after the open determination period; and starting the next open protection period when the sense voltage is lower than the open reference voltage during the next open determination period after the open protection period.

18. The switch control method of claim 17, wherein the controlling of the open protection operation further comprises:

counting a clock signal that determines a switching frequency of the power switch to generate a protection start signal when the open determination period is passed and generating a protection expiring signal when the open protection period is passed;

resetting the counting result of the clock signal according to a logic operation result of a under-voltage lockout signal that is generated when the protection expiring signal and a power voltage for switching control operation of the power switch are lower than a predetermined normal level as a result of the comparison between the sense voltage and the open reference voltage; and controlling termination of the open line protection operation by performing a logic operation on the protection expiring signal and the low-voltage blocking signal.

19. The switch control method of claim 16, wherein the controlling of the open protection operation further comprises terminating the open line protection operation when a plug-out occurs and thus the AC input to a power supply device including the switch control circuit is blocked after then open determination period.

20. The switch control method of claim 19, wherein the controlling of the open protection operation further comprises:

generating a protection start signal when an open determination period is passed by counting a clock signal that determines the switching frequency of the power switch;

resetting the counting result of the clock signal according to the comparison result between the sense voltage and the open reference voltage and the result of the logic operation performed on a under-voltage lockout signal that is generated when the protection expiring signal and a power voltage for switching control operation of the power switch are lower than a predetermined normal level; and controlling the start of the open ling protection operation by being synchronized by the protection start signal and controlling termination of the open line protection operation by being synchronized by the low-voltage blocking signal.

* * * * *